(12) United States Patent
Brunner

(10) Patent No.: US 8,405,736 B2
(45) Date of Patent: Mar. 26, 2013

(54) FACE DETECTION USING ORIENTATION SENSOR DATA

(75) Inventor: Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 12/755,693

(22) Filed: Apr. 7, 2010

(65) Prior Publication Data

US 2011/0249142 A1  Oct. 13, 2011

(51) Int. Cl.
*H04N 5/228* (2006.01)
*H04N 5/238* (2006.01)
*G06K 9/00* (2006.01)
*G06K 9/36* (2006.01)

(52) U.S. Cl. ............ 348/222.1; 348/364; 382/118; 382/289

(58) Field of Classification Search .............. None
See application file for complete search history.

(56) References Cited

U.S. PATENT DOCUMENTS

| | | | | |
|---|---|---|---|---|
| 6,597,817 | B1* | 7/2003 | Silverbrook | 382/289 |
| 7,564,486 | B2* | 7/2009 | Ikeda | 348/222.1 |
| 2001/0007469 | A1* | 7/2001 | Fuchimukai et al. | 348/208 |
| 2005/0069208 | A1* | 3/2005 | Morisada | 382/190 |
| 2006/0182433 | A1* | 8/2006 | Kawahara et al. | 396/123 |
| 2006/0204034 | A1 | 9/2006 | Steinberg et al. | |
| 2007/0229695 | A1 | 10/2007 | Kato | |
| 2008/0037838 | A1* | 2/2008 | Ianculescu et al. | 382/118 |
| 2008/0152199 | A1* | 6/2008 | Oijer | 382/118 |
| 2009/0086050 | A1 | 4/2009 | Kasakawa | |
| 2009/0202180 | A1* | 8/2009 | Ericson | 382/313 |
| 2010/0008548 | A1* | 1/2010 | Matsuoka | 382/118 |
| 2010/0040356 | A1* | 2/2010 | Ishikawa | 396/124 |
| 2011/0158547 | A1* | 6/2011 | Petrescu et al. | 382/224 |

OTHER PUBLICATIONS

Jones, Michael and Paul Viola. "Fast Multi-view Face Detection." Mitsubishi Electric Research Laboratories: Cambridge, MA. Jul. 2003. pp. 1-10.

* cited by examiner

*Primary Examiner* — Justin P Misleh
(74) *Attorney, Agent, or Firm* — Wong, Cabello, Lutsch, Rutherford & Brucculeri

(57) ABSTRACT

Techniques for reducing the amount of time a camera device requires to automatically adjust focus and/or exposure settings prior to image capture are described. As disclosed, sensor data is used to identify the camera device's orientation. Once known, face detection operations are performed for only that orientation thereby dramatically reducing the amount of processing time required to perform the face detection. The result of the face detection operations may be used to automatically adjust the image capture device's focus and/or exposure.

22 Claims, 8 Drawing Sheets

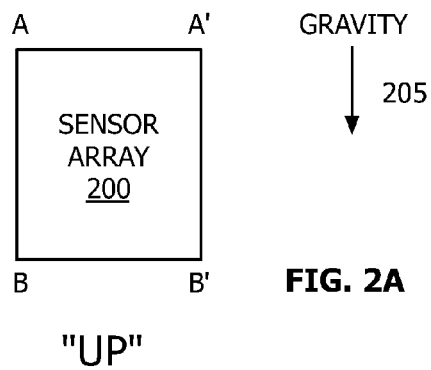
FIG. 2A "UP"
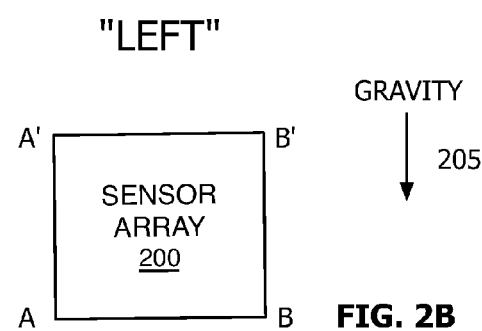
"LEFT" FIG. 2B
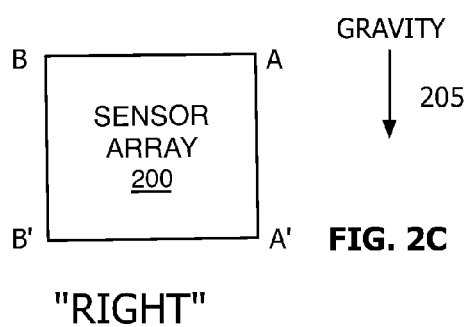
FIG. 2C "RIGHT"
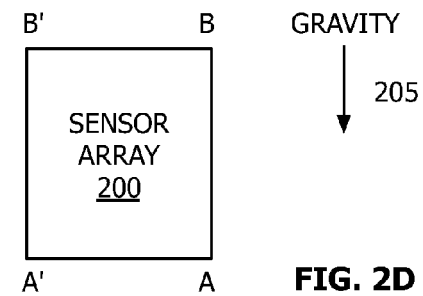
"DOWN" FIG. 2D

FACE DETECTION USING ORIENTATION SENSOR DATA

BACKGROUND

This disclosure relates generally to the field of image processing. More particularly, but not by way of limitation, it relates to a technique for selecting an orientation from which to perform face detection.

In recent years the proliferation of digital cameras has been rapid, both as stand-alone devices and as part of other consumer products such as, for example, mobile phones and personal digital assistants (PDAs). Many digital cameras are fully or semi-automatic in the sense that the camera's focus and/or exposure are set automatically (i.e., without direct user input). For those images that include people, if a face can be detected in the image field, the camera's focus and/or exposure may be automatically set to optimize the capture of same.

Referring now to FIG. 1, prior art auto-operation 100 is shown. Here, image information is received from, for example, a CMOS or CCD sensor array (block 105) after which a first orientation is selected (block 110). As used herein, an image's orientation may be determined in relation to the plane of the camera's sensor array with respect to the gravity vector. Referring to FIG. 2A, "UP" may be defined as that orientation in which sensor array 200's side A-A' is above side B-B' in relation to gravity vector 205. Similarly, "LEFT" may be defined as shown in FIG. 2B, "RIGHT" as shown in FIG. 2C and "DOWN" as shown in FIG. 2D.

Returning now to FIG. 1, once a first orientation is selected (block 110), a face detection algorithm may be performed to determine if a face can be found for that orientation (block 115). If no face is detected (the "NO" prong of block 120), a further check is made to determine if all desired or specified orientations have been analyzed (e.g., UP, LEFT, RIGHT and DOWN). If at least one of these orientations has not been analyzed (the "NO" prong of block 125), another orientation is selected (block 130) where after processing continues at block 115.

If a face is detected at the selected orientation (the "YES" prong of block 120), that information may be used to automatically adjust the camera's focus and/or exposure (block 135). For example, a typical implementation in point-and-shoot cameras is to show the detected faces in the camera's view screen and, when the shutter is pressed, the camera performs an autofocus operation using the face area as the target. Once all orientations have been checked and no face has been found (the "YES" prong of block 125), the image's focus and exposure may be adjusted using other information (block 140). For example, a set of fixed focus points may be used (it will be recognized that different cameras may have different selected points on/at which to focus).

The processing power and time required to analyze a number of different orientations can be significant. In general, the processing power of digital camera devices is limited. Further, the time required to perform the processing outlined in FIG. 1 can negatively affect the quality of a user's experience of the camera. Accordingly, there is a need for a means to quicken the detection of faces in an image field.

SUMMARY

Methods and devices disclosed herein provide the means for reducing the amount of time a camera device requires to automatically adjust operational parameters (e.g., the focus and/or exposure) of an image capture device (e.g., a digital still camera device or a digital video camera device). As disclosed herein, sensor data is used to identify the camera device's orientation. Once known, face detection may be performed for only that orientation thereby dramatically reducing the amount of processing time required to perform face detection. The result of the face detection operations may be used to automatically adjust one or more of the image capture device's operational parameters (e.g., focus and/or exposure). Sensor data may come from any device(s) capable of measuring a moment of inertia such as, for example, accelerometers and gyroscopes.

BRIEF DESCRIPTION OF THE DRAWINGS

FIGS. 2A through 2D show four illustrative orientations of a camera device's sensor array.

DETAILED DESCRIPTION

Various embodiments of the present invention provide techniques for reducing the amount of time a camera device requires to automatically adjust focus and/or exposure settings prior to image capture. As disclosed herein, sensor data is used to identify the camera device's orientation. Once known, face detection is performed for only that orientation thereby dramatically reducing the amount of processing time required to perform face detection. Sensor data may come from any device(s) capable of measuring a moment of inertia such as, for example, accelerometers and gyroscopes.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous programming and component decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the image processing field having the benefit of this disclosure.

The language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
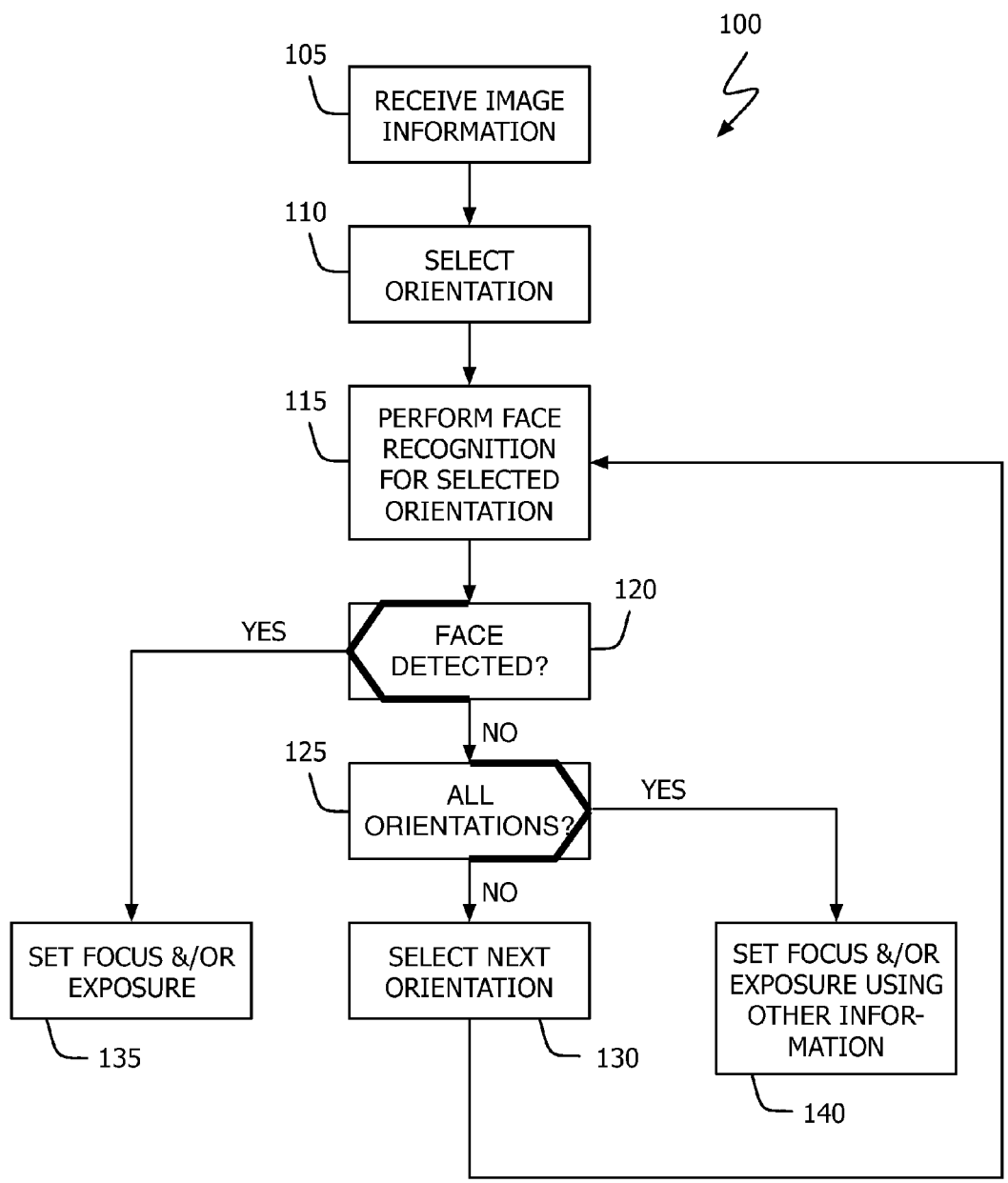
FIG. 1 shows, in flowchart format, a prior art auto focus/exposure operation that uses face detection techniques.
Figure 3:
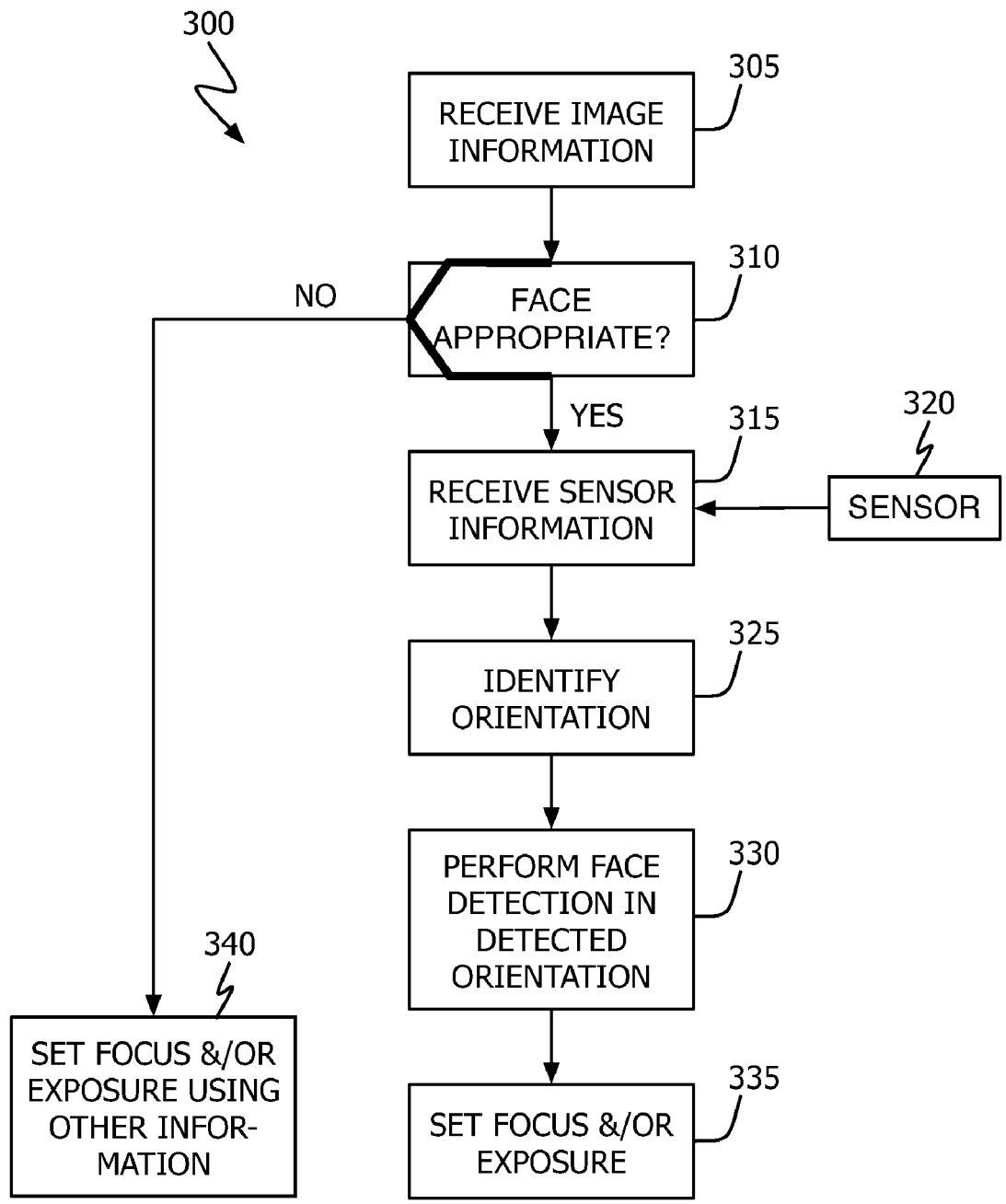
FIG. 3 shows, in flowchart format, an auto focus/exposure operation that utilizes orientation sensor input in accordance with one embodiment.

Referring to FIG. 3, auto-operation 300 in accordance with this disclosure begins with the reception of image data (block 305). A check is then made to determine if it is appropriate to look for faces in the image (block 310). If the image is "face appropriate" (the "YES" prong of block 310), orientation data is received (block 315) from sensor 320. From the orientation data, an orientation for the camera device is identified (block 325) and face detection processing is performed for that orientation only (block 330). It will be recognized that if the coordinate system used for the images does not coincide with the coordinate system for sensor 320, it may be necessary to project the sensor's (e.g., accelerometer's) vector into the image plane to determine what direction is "up" (FIG. 2A), "left" (FIG. 2B), "right" (FIG. 2C) or "down" (FIG. 2D). With one or more faces detected, the camera device's focus and/or exposure may be automatically set in either a conventional manner (using standard auto-focus techniques on a location of the detected faces) or via novel techniques such as that disclosed in co-pending patent application entitled "Dynamic Exposure Metering Based on Face Detection," Ser. No. 12/755,542 (335). In one embodiment, if multiple faces are detected the largest face is selected for purposes of automatically setting the device's focus and/or exposure. In another embodiment, the "middle" face may be selected. In yet another embodiment, the most "right" or most "left" face may be selected. If the received image data is not appropriate for face detection techniques (the "NO" prong of block 310), the image's focus and/or exposure may be adjusted using other information in a conventional manner (block 340). For example, a conventional manner may include using a set of one or more fixed targets.

With respect to the face detection process of block 330, any available algorithm may be used. Illustrative suitable algorithms include, but are not limited to, the Rowley, Baluja & Kanade neural network based face detection algorithm, the Viola-Jones object detection framework and the Schneiderman and Kanade statistical method. In one embodiment, the selected face detection algorithm may be modified to search for faces in only the identified orientation (from the many possible orientations the algorithm may be applied to).

Figure 4:
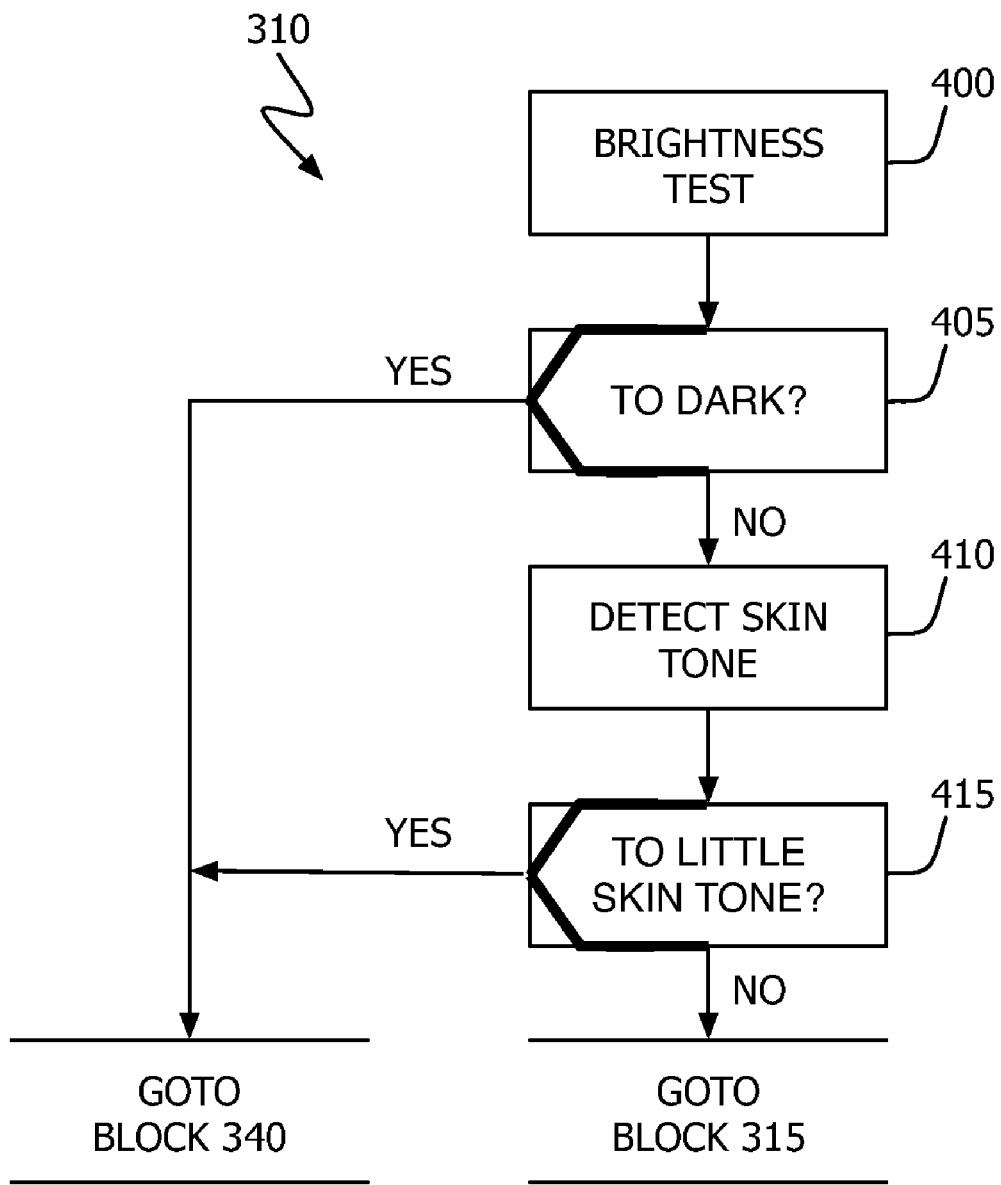
FIG. 4 shows, in flowchart format, acts in accordance with block 310 of FIG. 3.

With respect to acts in accordance with block 310, one or more pre-screening tests may be applied to the image data to determine if it is appropriate to search for faces. Referring to FIG. 4, acts in accordance with one embodiment of block 310 may perform a brightness test (block 400). If the image is to dark (the "YES" prong of block 405), processing continues at block 340. In one embodiment, a "to dark" threshold is determined empirically. In practice, a threshold may be selected and used to process a "test" set of images. The threshold may then be adjusted until a satisfactory false-positive/false-negative rate is established. If the image is not to dark (the "NO" prong of block 405), a skin tone detection process is performed (block 410). If no skin tone, or to little skin tone, is detected in the image data (the "YES" prong of block 415), processing again continues at block 340. In one embodiment, what constitutes "to little" skin tone is experimentally determined. For example, in one embodiment ½ or 5/16's or ¼ of the pixels must be identified as being skin tone colors. If, on the other hand, sufficient skin tone is detected in the image data (the "NO" prong of block 415), processing continues at block 315. (While not necessary, in one embodiment to further speed up the face detection processing of block 330, only those regions determined to contain skin tone data are searched for faces, i.e., during acts in accordance with block 330.) In another embodiment, one or more of these tests do not need to be run. One of ordinary skill in the art will recognize that the precise values of what constitutes "to dark" or "to little skin tone" is highly camera and color space dependent.

Figure 5:
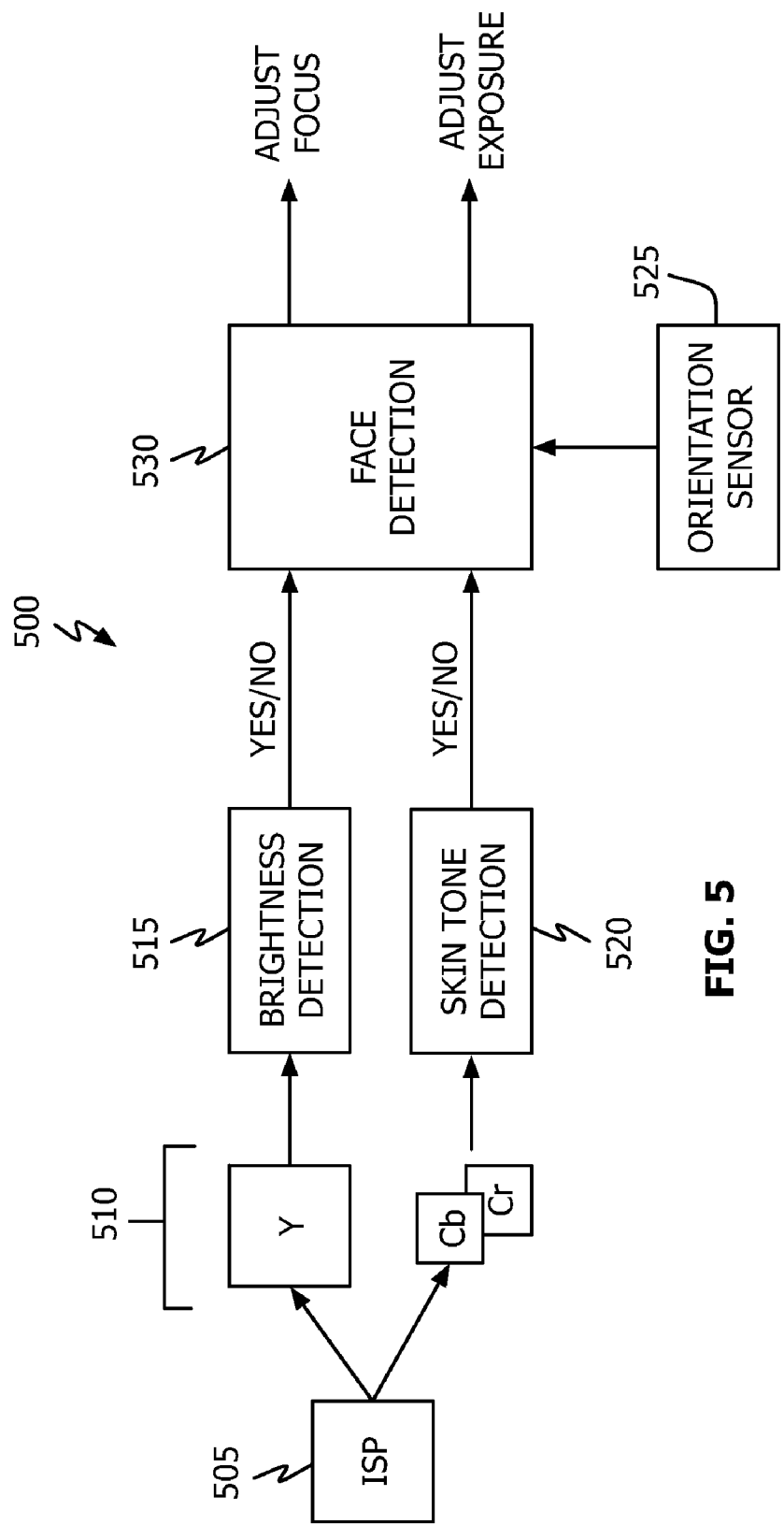
FIG. 5 shows, in block diagram format, a system in accordance with one embodiment.

Referring to FIG. 5, a functional block diagram of camera system 500 is shown in accordance with one embodiment. In this embodiment, integrated sensor package (ISP) 505 provides image data 510 in the form of luminance (Y) and chroma data (Cb and Cr). In accordance with block 310 brightness test 515 may be performed on Y data and skin tone detection 520 may be performed on chroma data. If both of these tests indicate face detection is appropriate, orientation sensor 525 provides orientation information which is used by face detection 530 process. A result of face detection is the automatic adjustment of system 500's focus and/or exposure. In one embodiment Y data is used by face detection 530 processing. In another embodiment, both Y and Cb/Cr data may be used. In yet another embodiment, rather than Y and Cb/Cr data, ISP 505 may provide RGB data which is then used by face detection 530 processing.

Figure 6:
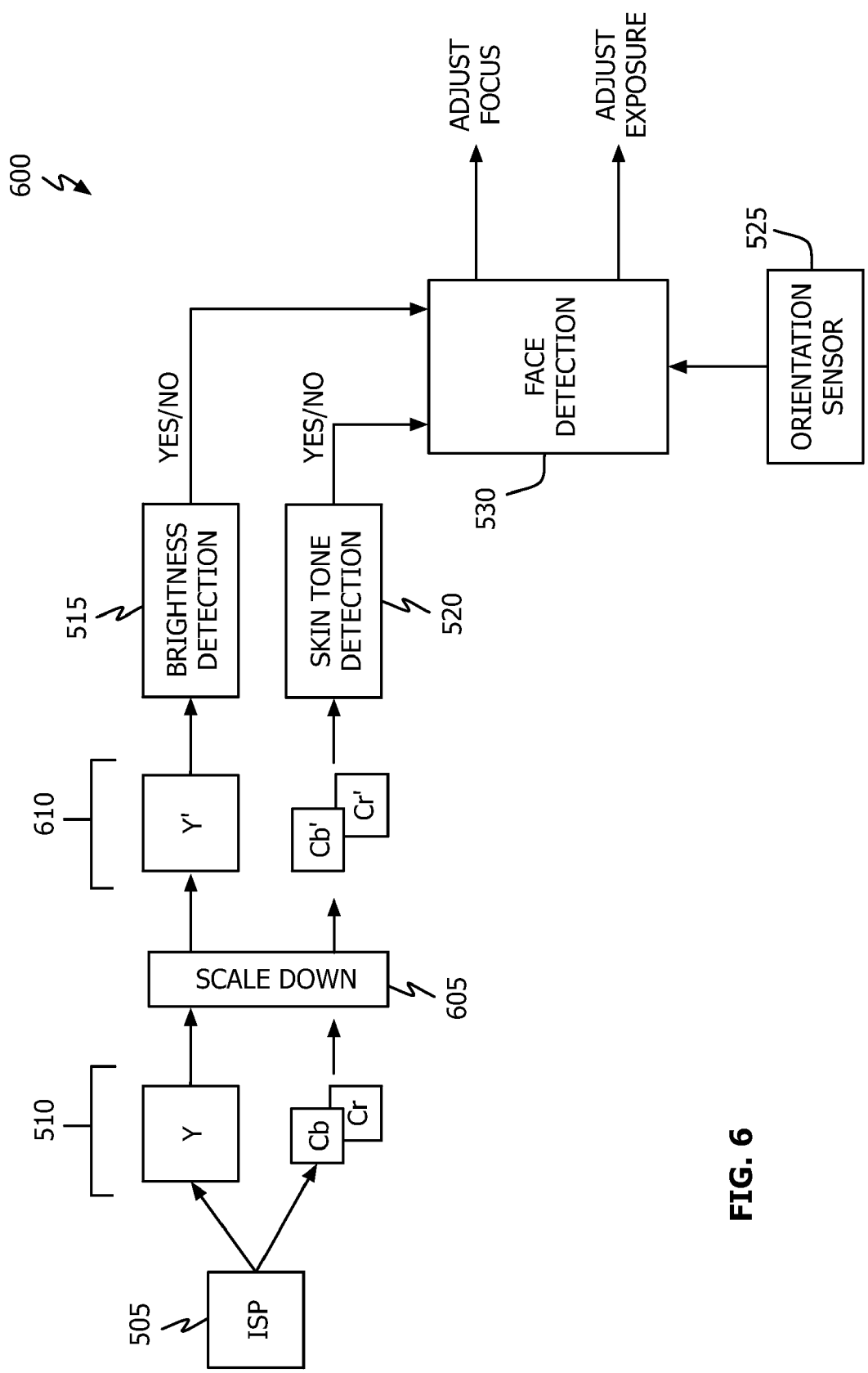
FIG. 6 shows, in block diagram format, a system in accordance with another embodiment.

Referring to FIG. 6, a functional block diagram of camera system 600 is shown in accordance with another embodiment. In this embodiment, image data 510 is scaled down 605 to generate reduced image data 610 which may then be processed as discussed above with respect to FIG. 5.

Figure 7:
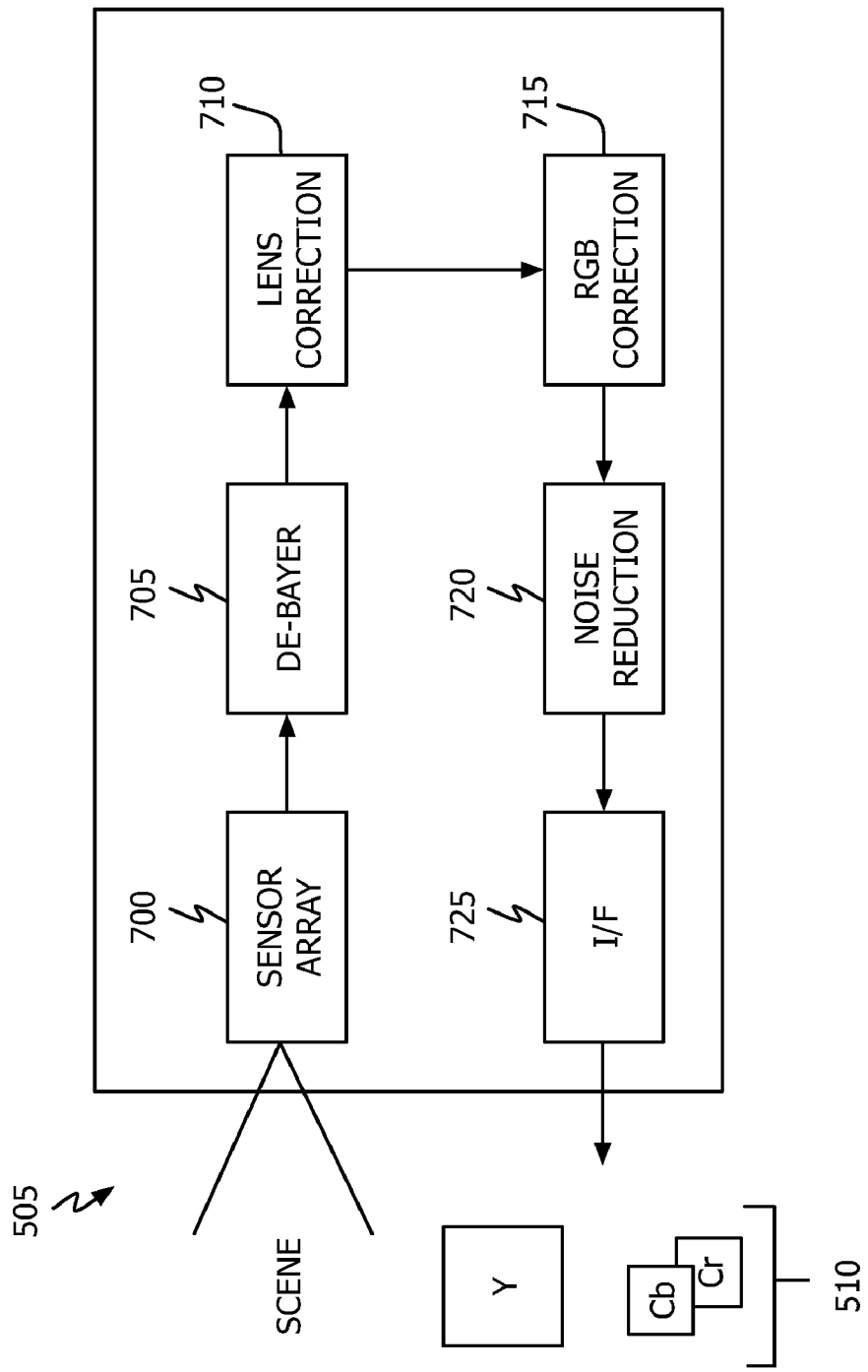
FIG. 7 shows, in block diagram format, an integrated sensor package in accordance with one embodiment.

Referring now to FIG. 7, ISP 505 in accordance with one embodiment receives scene data at sensor array 700 (e.g., a CMOS or CCD array). Sensor array 700 output may have demosaicing or de-Bayering processes 705 performed as is well known in the art. Next, ISP 505 can perform lens correction actions 710 to correct the image for various lens distortions including vignetting artifacts (i.e., light fall-off towards the image frame's edge) and color uniformity. Image data can then be sent to RGB gamma correction and tone mapping process 715 and passed through noise reduction filter 720 to remove any "noise" pixels. Finally, the image data may be encoded into the YCbCr family of color spaces 510 and passed over interface 725 for processing in accordance with various embodiments of the invention.

Figure 8:
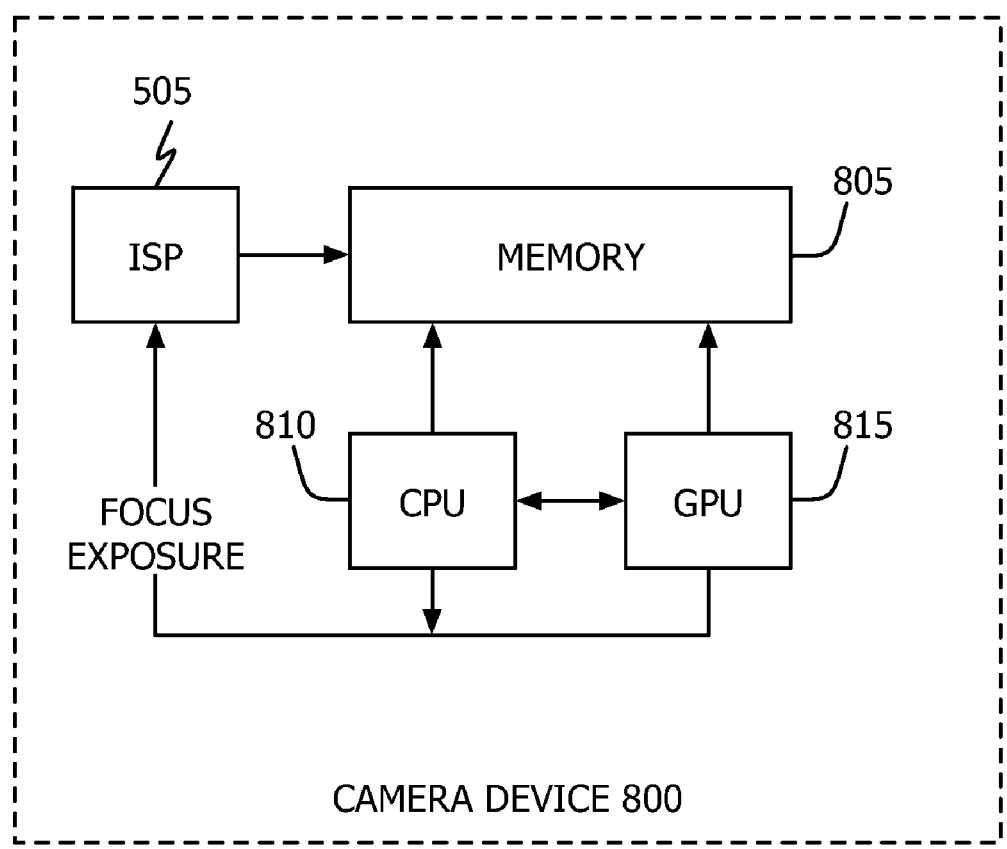
FIG. 8 shows, in block diagram format, a camera device in accordance with one embodiment.

Referring to FIG. 8, camera device 800 includes ISP 505, memory 805, central processing unit (CPU) 810 and graphics processing unit 815. Memory 805 may be used to contain image data (e.g., YCbCr data 510 or 610) which can be manipulated in accordance with various embodiments as described in FIGS. 3-7. Camera device 800 may be a stand-along digital camera, a digital video camera or other consumer device such as a mobile phone, a personal digital assistant or a computer system (e.g., a personal computer system such as a desktop computer system or a portable computer system). It will be recognized that memory 805 may be any storage device or devices suitable for the retention of image data such as, for example, random access memory (RAM) and flash memory. Memory 805 may also include one or more storage devices suitable for tangibly embodying program instructions in accordance with various embodiments and may include, but is not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Acts in accordance with various embodiments may be performed by CPU 810, GPU 815 or a combination of CPU 810 and GPU 815. Further, CPU 810 represents any programmable control device capable of executing instructions organized into one or more program modules stored in memory 805. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs").

It will be recognized that various changes in the details of the illustrated operational methods are possible without departing from the scope of the following claims. For instance, acts in accordance with block 310 need not be performed and, if performed, need not include or be limited to testing for brightness and skin tone. In addition, orientation may not be limited to the four (4) directions depicted in FIG. 2. Finally, it is to be understood that the above description is intended to be illustrative, and not restrictive. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to automatically adjust an image capture metric on a camera device, comprising:
   receiving image information from an image capture sensor array prior to image capture;
   receiving orientation information from an orientation sensor prior to image capture, the orientation sensor determining orientation information relative to gravity;
   determining if the image information is suitable for a face detection operation;
   identifying an orientation for the image capture device prior to image capture, the orientation identified based on the orientation information;
   performing the face detection operation on the image information prior to image capture in accordance with the identified orientation after the image information was determined suitable for the face detection operation;
   identifying a candidate face from a plurality of faces detected by the face detection operation;
   terminating until image capture, further face detection operations for orientations not identified by the orientation information after at least one face has been detected in the image information; and
   adjusting an image capture metric in accordance with the identified candidate face;
   wherein performing a face detection operation on the image information prior to capture is only performed for the orientation identified by the orientation information.

2. The method of claim 1, wherein the act of receiving image information from an image capture sensor array comprises receiving image information from a charge coupled device.

3. The method of claim 1, wherein the act of receiving orientation information from an orientation sensor comprises receiving orientation information from an accelerometer device.

4. The method of claim 1, wherein the act of adjusting an image capture metric comprises adjusting a focus metric for the image capture metric.

5. The method of claim 4, further comprising adjusting an exposure metric for the image capture metric.

6. The method of claim 1, further comprising performing the face detection operation on the image information only if the image information is previously determined to be suitable for a face detection operation.

7. The method of claim 1, wherein the act of determining if the image information is suitable for a face detection operation comprises:
   detecting a brightness of the image information; and
   determining the image information is suitable for a face detection operation only if the brightness is greater than a specified threshold.

8. The method of claim 1, wherein the act of determining if the image information is suitable for a face detection operation comprises:
   detecting skin tone information of the image information; and
   determining the image information is suitable for a face detection operation only if the detected skin tone information is greater than a specified threshold.

9. A non-transitory program storage device containing instructions for causing a programmable control device to perform the method of claim 1.

10. A system, comprising:
    an image capture sensor array;
    an orientation sensor;
    memory coupled to the image capture sensor array; and
    a programmable control device communicatively coupled to the memory and the orientation sensor, the memory including instructions for causing the programmable control device to:
       determine if image information from the image capture sensor array is suitable for a face detection operation;
       perform a face detection operation on the image information from the image capture device in the memory in accordance with an identified orientation as determined from orientation information received from the orientation sensor prior to image capture after a determination that the image information is suitable for a face detection operation;
       identify a candidate face from a plurality of detected faces;
       terminate until image capture, further face detection operations for orientations not identified by the orientation information after at least one face has been detected in the image information; and
       adjust an image capture metric in accordance with the candidate face identified as a result of the face detection operation;
       wherein performing a face detection operation on the image information prior to capture is only performed for the orientation identified by the orientation information.

11. The system of claim 10, wherein the image capture sensor array comprises a digital camera.

12. The system of claim 10, wherein the image capture sensor array comprises a digital video camera.

13. The system of claim 10, wherein the image capture sensor array comprises a mobile phone.

14. The system of claim 10, wherein the image capture sensor array comprises a personal computer.

15. The system of claim 10, further comprising instructions in the memory for causing the programmable control device to adjust a focus setting of the image capture sensor array in response to the face detection operation.

16. The system of claim 15, further comprising instructions in the memory for causing the programmable control device to adjust an exposure setting of the image capture sensor array in response to the face detection operation.

17. The system of claim 10, further comprising instructions in the memory for causing the programmable control device to adjust an exposure setting of the image capture sensor array in response to the face detection operation.

18. The system of claim 10, wherein the instructions for causing the programmable control device to determine if image information from the image capture sensor array is suitable for a face detection operation comprise instructions to:
   detect a brightness of the image information; and
   determine the image information is suitable for the face detection operation only if the brightness is greater than a specified threshold.

19. The system of claim 10, wherein the instructions for causing the programmable control device to determine if image information from the image capture sensor array is suitable for a face detection operation comprise instructions to:
   detect skin tone information of the image information; and
   determine the image information is suitable for the face detection operation only if the detected skin tone information is greater than a specified threshold.

20. A method to automatically adjust an image capture metric on a camera device, comprising:
   receiving image information from an image capture sensor array prior to image capture;
   receiving orientation information from an orientation sensor prior to image capture, the orientation sensor determining orientation information relative to gravity;
   determining if the image information is suitable for a face detection operation;
   identifying an orientation for the image capture device prior to image capture, the orientation identified based on the orientation information;
   performing the face detection operation on the image information prior to image capture in accordance with the identified orientation after the image information was determined suitable for the face detection operation;
   identifying a candidate face from a plurality of faces detected by the face detection operation; and
   adjusting an image capture metric in accordance with the identified candidate face;
   wherein performing a face detection operation on the image information prior to capture is only performed for the orientation identified by the orientation information; and
   wherein the candidate face comprises a face selected as a middle face relative to other faces from the plurality of faces and the identified orientation, a left-most face relative to other faces from the plurality of faces and the identified orientation, or a right-most face relative to other faces from the plurality of faces and the identified orientation.

21. A non-transitory program storage device containing instructions for causing a programmable control device to perform the method of claim 20.

22. A system, comprising:
   an image capture sensor array;
   an orientation sensor;
   memory coupled to the image capture sensor array; and
   a programmable control device communicatively coupled to the memory and the orientation sensor, the memory including instructions for causing the programmable control device to:
      receive image information from an image capture sensor array prior to image capture;
      receive orientation information from an orientation sensor prior to image capture, the orientation sensor determining orientation information relative to gravity;
      determine if the image information is suitable for a face detection operation;
      identify an orientation for the image capture device prior to image capture, the orientation identified based on the orientation information;
      perform the face detection operation on the image information prior to image capture in accordance with the identified orientation after the image information was determined suitable for the face detection operation;
      identify a candidate face from a plurality of faces detected by the face detection operation; and
      adjust an image capture metric in accordance with the identified candidate face;
   wherein performing a face detection operation on the image information prior to capture is only performed for the orientation identified by the orientation information; and
   wherein the candidate face comprises a face selected as a middle face relative to other faces from the plurality of faces and the identified orientation, a left-most face relative to other faces from the plurality of faces and the identified orientation, or a right-most face relative to other faces from the plurality of faces and the identified orientation.

* * * * *